United States Patent
Masberg et al.

(10) Patent No.: US 6,405,701 B1
(45) Date of Patent: *Jun. 18, 2002

(54) SYSTEM FOR ACTIVELY REDUCING ROTATIONAL NONUNIFORMITY OF A SHAFT, IN PARTICULAR, THE DRIVE SHAFT OF AN INTERNAL COMBUSTION ENGINE, AND METHOD FOR THIS

(75) Inventors: Ullrich Masberg, Rösrath/Kleineichen; Thomas Pels, Overath; Klaus-Peter Zeyen, Köln; Andreas Gründl, München; Bernhard Hoffmann, Starnberg, all of (DE)

(73) Assignees: ISAD Electronic Systems GmbH & Co. KG, Köln; Gründl und Hoffmann GmbH Gesellschaft für elektrotechnische Entwicklungen, Starnberg, both of (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/032,321

(22) Filed: Feb. 27, 1998

Related U.S. Application Data

(63) Continuation of application No. PCT/DE96/01618, filed on Aug. 31, 1996.

(30) Foreign Application Priority Data

Aug. 31, 1995 (EP) .......................................... 195 32 129

(51) Int. Cl.[7] ................................................. F02B 75/06
(52) U.S. Cl. ................................................... 123/192.1
(58) Field of Search ........................... 123/192.1, 192.2; 180/65.2, 65.4

(56) References Cited

U.S. PATENT DOCUMENTS

| 1,961,679 A | * | 6/1934 | Wälti | |
| 2,654,849 A | | 10/1953 | Trofimov | ..................... 310/99 |
| 2,790,917 A | | 4/1957 | Trofimov | ..................... 310/102 |

(List continued on next page.)

FOREIGN PATENT DOCUMENTS

| AU | 58401-73 | 1/1975 |
| DE | 282 671 | 8/1912 |
| DE | 874 713 | 6/1952 |

(List continued on next page.)

OTHER PUBLICATIONS

"Kraftfahrzeugtechnik" 11/82, pp. 346–347.
Litton prospect "Bürstenlose Hohlwellen–Resolver SSBH–15", Unterföhring.
J. Reinert et al., "Digital Control and Optimization of a Rolling Rotor Switched Reluctance Maching", *IEEE Transactions on Industry Appliations*, vol. 13, No. 2, Mar./Apr. 1995, pp. 338–344.

(List continued on next page.)

*Primary Examiner*—Tony M. Argenbright
*Assistant Examiner*—Hai Huynh
(74) *Attorney, Agent, or Firm*—Blakely, Sokoloff, Taylor & Zafman

(57) ABSTRACT

The invention concerns a system for active reduction of rotational nonuniformities of a shaft, especially the drive shaft (10) of an internal combustion engine or a shaft that is coupled or can be coupled to it, with at least one electric machine (4), which is coupled or can be coupled to the shaft, wherein the electric machine (4) is controlled such that it generates a rapidly varying torque, to reduce the rotational nonuniformities, and it superimposes on this torque a positive or negative torque in order to further achieve a driving action or braking or generator type action. The invention is also oriented to a corresponding method for active reduction of rotational nonuniformities.

13 Claims, 4 Drawing Sheets

U.S. PATENT DOCUMENTS

| | | | |
|---|---|---|---|
| 3,744,303 A | 11/1973 | Burkett et al. | 30/382 |
| 3,870,116 A | 3/1975 | Seliber | 180/54 R |
| 3,902,073 A | 8/1975 | Lafuze | 290/463 |
| 3,974,396 A | 8/1976 | Schönball | 290/54 |
| 4,025,860 A | 5/1977 | Shibata et al. | 320/3 |
| 4,066,936 A | 1/1978 | Hirota | 318/139 |
| 4,346,773 A | 8/1982 | Hofbauer et al. | 180/165 |
| 4,699,097 A | 10/1987 | Tanaka et al. | 123/192 |
| 4,797,602 A | 1/1989 | West | 322/10 |
| 4,803,376 A | 2/1989 | N'Guyen | 290/22 |
| 4,883,973 A | 11/1989 | Lakey et al. | 290/31 |
| 4,922,869 A * | 5/1990 | Kadomukai et al. | |
| 4,942,950 A | 7/1990 | Watanabe et al. | 192/0.096 |
| 4,958,095 A | 9/1990 | Uchida | 310/59 |
| 4,977,508 A * | 12/1990 | Tamaka et al. | |
| 5,033,425 A * | 7/1991 | Kadomukai et al. | |
| 5,053,632 A | 10/1991 | Suzuki et al. | 290/45 |
| 5,109,815 A | 5/1992 | Maeda et al. | 123/192.1 |
| 5,125,236 A | 6/1992 | Clancey et al. | 62/115 |
| 5,126,641 A | 6/1992 | Putman et al. | 318/128 |
| 5,185,543 A * | 2/1993 | Tebbe | |
| 5,303,794 A | 4/1994 | Hrovat et al. | 180/197 |
| 5,323,743 A | 6/1994 | Kristiansson | 123/179.3 |
| 5,325,042 A | 6/1994 | Murugan | 322/10 |
| 5,359,308 A | 10/1994 | Sun et al. | 335/216 |
| 5,431,241 A | 7/1995 | May et al. | 180/197 |
| 5,537,697 A * | 7/1996 | Tajhiro et al. | |
| 5,553,514 A * | 9/1996 | Walkowe | |
| 5,664,534 A * | 9/1997 | Schmitz | |
| 6,138,629 A * | 10/2000 | Masberg et al. | 123/192.1 |
| 6,148,784 A * | 11/2000 | Masberg et al. | 123/192.1 |
| 6,158,405 A * | 12/2000 | Masberg et al. | 123/192.1 |

FOREIGN PATENT DOCUMENTS

| | | | |
|---|---|---|---|
| DE | 893 299 | 1/1953 | |
| DE | 904 737 | 6/1953 | |
| DE | 938 680 | 6/1954 | |
| DE | 1 077 072 | 3/1960 | |
| DE | 1 156 319 | 10/1963 | |
| DE | 1 165 422 | 3/1964 | |
| DE | 1 284 853 | 12/1968 | |
| DE | 23 45 018 A1 | 4/1974 | |
| DE | 23 53 724 B2 | 5/1974 | |
| DE | 27 04 533 A1 | 8/1978 | |
| DE | 28 55 886 A1 | 6/1979 | |
| DE | 29 02 376 C2 | 7/1979 | |
| DE | 28 23 225 A1 | 11/1979 | |
| DE | 29 17 139 A1 | 11/1980 | |
| DE | 29 43 563 A1 | 5/1981 | |
| DE | 30 09 503 A1 | 9/1981 | |
| DE | 30 13 424 A1 | 10/1981 | |
| DE | 30 48 972 C2 | 7/1982 | |
| DE | 30 50 269 A1 | 10/1982 | |
| DE | 32 30 121 A1 | 2/1984 | |
| DE | 32 30 607 A1 | 2/1984 | |
| DE | 32 43 513 A1 | 5/1984 | |
| DE | 33 43 018 C2 | 6/1984 | |
| DE | 32 43 514 C2 | 9/1984 | |
| DE | 33 35 923 A1 | 9/1984 | |
| DE | 33 38 548 A1 | 5/1985 | |
| DE | 35 37 994 A1 | 5/1986 | |
| DE | 37 37 192 A1 | 7/1988 | |
| DE | 38 14 484 A1 | 11/1988 | |
| DE | 37 43 289 A1 | 6/1989 | |
| DE | 38 12 296 A1 | 11/1989 | |
| DE | 39 37 082 A1 | 5/1990 | |
| DE | 39 26 054 A1 | 2/1991 | |
| DE | 40 27 664 A1 | 3/1991 | |
| DE | 39 39 695 C1 | 5/1991 | |
| DE | 40 38 301 A1 | 6/1991 | |
| DE | 40 00 678 A1 | 7/1991 | |
| DE | 41 00 937 A1 | 8/1991 | |
| DE | 40 11 291 A1 | 10/1991 | |
| DE | 41 34 268 A1 | 4/1992 | |
| DE | 42 13 132 A1 | 11/1992 | |
| DE | 41 24 496 A1 | 1/1993 | |
| DE | 42 02 083 A1 | 7/1993 | |
| DE | 42 02 737 A1 | 8/1993 | |
| DE | 42 30 510 C1 | 9/1993 | |
| DE | 42 25 683 A1 | 2/1994 | |
| DE | 43 30 193 A1 | 3/1994 | |
| DE | 43 18 949 C1 | 6/1994 | |
| DE | 43 39 252 A1 | 6/1994 | |
| DE | 43 91 898 C2 | 6/1994 | |
| DE | 43 44 053 A1 | 7/1994 | |
| DE | 43 11 697 A1 | 10/1994 | |
| DE | 43 14 290 A1 | 11/1994 | |
| DE | 43 23 601 A1 | 1/1995 | |
| DE | 43 23 602 A1 | 1/1995 | |
| DE | 44 04 791 C1 | 3/1995 | |
| DE | 44 02 152 C1 | 4/1995 | |
| DE | 295 02 906 U1 | 4/1995 | |
| DE | 44 37 322 A1 | 5/1995 | |
| DE | 44 21 512 C1 | 6/1995 | |
| DE | 44 08 719 C1 | 7/1995 | |
| DE | 44 23 577 A1 | 8/1995 | |
| DE | 44 12 945 A1 | 10/1995 | |
| DE | 44 12 438 C1 | 11/1995 | |
| EP | 0 151 934 A1 | 8/1985 | |
| EP | 0175 952 * | 4/1986 | |
| EP | 0 175 952 A2 | 4/1986 | |
| EP | 0 233 738 A1 | 8/1987 | |
| EP | 0 338 485 A2 | 10/1989 | |
| EP | 0 354 790 A2 | 2/1990 | |
| EP | 0 385 311 A2 | 9/1990 | |
| EP | 0 427 568 A1 | 5/1991 | |
| EP | 0 437 266 A2 | 7/1991 | |
| EP | 0 440 088 A1 | 8/1991 | |
| EP | 0 530 659 A1 | 3/1993 | |
| EP | 0 557 522 A1 | 9/1993 | |
| EP | 0 569 347 A2 | 11/1993 | |
| EP | 0 604 979 A2 | 7/1994 | |
| EP | 0 612 928 A1 | 8/1994 | |
| FR | 2481656 | 11/1981 | |
| FR | 2563280 | 10/1985 | |
| GB | 20 42 772 A | 9/1980 | |
| JP | 000 5453 * | 1/1980 | 123/192.1 |
| JP | 0005454 * | 1/1980 | 123/192.1 |
| JP | 55005454 | 1/1980 | |
| JP | 58126434 | 7/1983 | |
| JP | 59184020 | 10/1984 | |
| JP | 60066820 | 8/1986 | |
| JP | 61200333 | 9/1986 | |
| JP | 62166749 | 7/1987 | |
| JP | 1113571 | 5/1989 | |
| JP | 4011825 39 * | 7/1989 | 123/192.1 |
| JP | 1190922 | 8/1989 | |
| JP | 4024156 | 1/1992 | |
| JP | 05211258 | 8/1993 | |
| JP | 07105943 | 4/1995 | |
| WO | WO 88/08636 | 11/1988 | |
| WO | WO 91/16538 | 10/1991 | |
| WO | WO 94/19856 | 9/1994 | |
| WO | WO 95/02758 | 1/1995 | |
| WO | WO 95/24072 | 9/1995 | |

OTHER PUBLICATIONS

F. Simovert, "Spannungszwischenkreis–Umrichter Baureihe 6SC44.. der Fa. Siemens AG", 1985, No. A 19100–E319–A262.

D. Teodorescu, "Kleinantriebe mit Vollpolläufer–Synchronmotoren", ema, 5/93, pp. 39–43.

English Translation Abstract of German language Cited "Other Art", pp. 9 total.

N. Saridakis, "Golf mit Otto–Elektro–Hybridantrieb", *ATZ, Atutomobiltechnische Zeitschrift* 87 (1985) 11, pp. 581–584.

H. Baumann, Siedekühlgefäβ mit Luftrückkühlung für Traktionsstromrichter hoher Leistung:, *etzArchiv*, vol. 11, 1989, No. 7, pp. 213–220.

E. Blessmann, "Magnetic Couplings", *Machine Design*, Feb. 9. 1989, pp. 105–108.

Robert Bosch GmbH, "Kraftfahrtechnisches Taschenbuch", VDI–Verlag, Düsseldorf, 21 ed. 1991, pp. 346–347; 361; 555–559; 763–767.

H. Deisenroth, C. Trabert: "Vermeidung von Überspannungen bei pulsumrichterantrieben" etz, vol. 114, 1993, No. 17, pp. 1060–1067.

W. Geiβler, F. Unger–Weber: "Modelling the Three–Phase Propulsion System of a Modern Multisystem–Locamotive", EPE Firenze, (1991), pp. 4–632—4 637.

G. und H. Häberle, "Elektrische Maschinen in Anlagen der Energietechnik", Verlag Europa–Lehrmittel, Haan–Gruiten, 3. Auflage, 1994, Seiten 169–172.

G. Henneberger, "Elektrische Motoraustrüstung", Braunschweig, 1990, pp. 98–103.

J. Langheim, J. Fetz: "Electric Citybus with two Induction Motors–Power Electronics and Motor Control", ETEP, vol. 2, No. 6, Nov./Dec. 1992, pp. 359–365.

L. Kung et al., "Hybrid III: Concepts for the Electric System of a Hybrid Passenger Car, Symp Proc 11th Int Electric Vehic Symp NA (NA) NA 1992", pp. 13 total.

* cited by examiner ized by the system and brought to an arbitrary value (within certain limits) independently of the reduction of rotational nonuniformities, even a nonvanishing value, for example, for operation as a motor or generator.
SYSTEM FOR ACTIVELY REDUCING ROTATIONAL NONUNIFORMITY OF A SHAFT, IN PARTICULAR, THE DRIVE SHAFT OF AN INTERNAL COMBUSTION ENGINE, AND METHOD FOR THIS This is a continuation of PCT/DE96/01618 filed on Aug. 31, 1996 which claims priority from German patent application No. 195 32 129.4 filed on Aug. 31, 1995.

BACKGROUND OF THE INVENTION

1. Field of the Invention

The invention relates to apparatus and methods for reducing non-uniformities of a shaft, such as the drive shaft of an internal combustion engine.

2. Description of the Related Art

In particular in internal combustion engines, nonuniformities occur in the rotation of the engine-driveshaft, which are due primarily to the gas and mass forces of the engine. Such rotational nonuniformities can impair the riding comfort, e.g., in a vehicle, and lead to wear on the drive system as well as other parts of the vehicle.

Therefore, it has already been proposed to outfit an internal combustion engine with a system for active reduction of rotational nonuniformities. The action of such a system is based on the fact that an electric machine or an electric brake generates an alternating torque, or even one which only pulsates in one direction, which is directed opposite the rotational nonuniformities and thereby reduces them. Examples of such systems are disclosed by Patent Abstracts of Japan, Volume 11, No. 28 (M-557), Jan. 27, 1987 & JP-A-61 200 333 (NISSAN I), Patent Abstract of Japan, Volume 4, No. 29 (M-002), Mar. 14, 1980 & JP-A-55 005 454 (TOYOTA), EP-B-0 427 568 (ISUZU), DE-A-32 30 607 (VW), EP-B-0 175 952 (MAZDA), Patent Abstracts of Japan, Volume 7, No. 240 (M-251), Oct. 25, 1983 and JP-A-58 126 434 (NISSAN II), DE-A-41 00 937 (FICHTEL & SACHS) and EP-A-0 604 979 (NIPPONDENSO).

In the above-mentioned EP-B-0 175 952 (MAZDA), the electric machine is a commutator machine with two separate rotor windings, one of which serves to operate the machine as a motor and the other to operate it as a generator. Since the machine is alternately operated as a motor and as a generator in brief time windows, it alternately generates positive and negative torques, which are directed opposite the rotational nonuniformities and which cancel each other out on average. In the intervals of time between two windows the machine is passive and generates no torque. The publication also mentions the possibility that the electric machine can support the internal combustion engine while accelerating and braking the vehicle. This is done through changes in the relative duration of the motor and generator time windows, i.e., through changes in the timing relations of motor and generator operation for constant magnitude of the particular motor and/or generator torque. For example, if the electric machine is supposed to support the engine while accelerating, the time windows for the generator operation are shortened and those for the motor operation are lengthened. The electric machine then generates—averaged out over a period—a positive torque. To generate a negative torque on average, the time windows for the motor operation are correspondingly shortened and those for the generator operation are lengthened. Also in EP-A-0 604 979 (NIPPONDENSO), the superpositioning of a vibration dampening function and a generator function can be accomplished by a timing relation (so-called duty cycle) other than one for the motor and generator operation, without changing the magnitude of the particular motor and/or generator torque.

The following, more remote state of the art does not pertain to the active vibration dampening: DE-A 33 35 923 (VW II), EP-A 0 437 266 (MAGNET-MOTOR), DE-A 32 43 513 (VW III), DE-A 33 38 548 (VW IV), DE-A 44 08 719 (VW V), W. Geissler, F. Unger-Weber: "Modeling the Three-Phase Propulsion System of a Modern Multisystem Locomotive," EPE, Florence, 1991, p. 4–632 to 4–637, and J. Langheim, J. Fetz: "Electric Citybus with Two Induction Motors—Power Electronics and Motor Control," ETEP, Vol. 2, No. 6, November/December 1992, p. 359 to 365.

With the systems of the two above-mentioned publications it is possible in theory to have the electric machine also generate a nonvanishing (on average) positive or negative torque, while reducing rotational nonuniformities.

SUMMARY OF THE INVENTION

A system for active reduction of rotational nonuniformities of a shaft, especially the drive shaft (10) of an internal combustion engine (1) or a shaft that is coupled or can be coupled to it, comprising at least one electric machine (4), especially a rotary-field or traveling wave machine, which is coupled or can be coupled to the shaft, wherein the electric machine (4) is controlled such that it generates a rapidly varying torque, to reduce the rotational nonuniformities, and it superimposes on this torque a positive or negative torque in order to further achieve a driving action or braking or generator type action.

BRIEF DESCRIPTION OF THE DRAWINGS

The invention shall now be explained more closely by means of sample embodiments and the enclosed schematic drawing. The drawing shows.

DETAILED DESCRIPTION OF THE EMBODIMENT

Figure 1A:
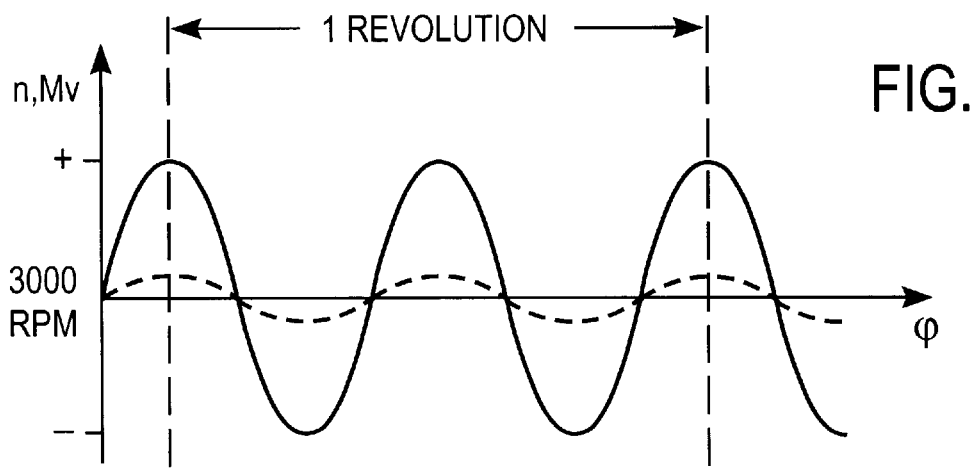
FIG. 1 a schematic sample representation of the functioning of the system for active reduction of rotational nonuniformities.

The aim of the invention is to further develop such systems.

It solves this problem with a system for active reduction of rotational nonuniformities of a shaft, in particular the drive shaft of an internal combustion engine or a shaft that is coupled or can be coupled to it, comprising at least one electric machine, which is coupled or can be coupled to the shaft, wherein the electric machine is controlled such that it generates a rapidly varying torque to reduce the rotational nonuniformities, and a positive or negative torque is superimposed on this torque to further accomplish a driving action or a braking or generator type action (Claim 1).

In particular, rotational nonuniformity can be such as occurs in an internal combustion engine, particularly a piston engine with internal combustion, through the gas and mass forces of the individual pistons acting on the drive shaft (i.e., especially the crankshaft). For example, in a four-cylinder four-stroke engine, relatively large rotational nonuniformity occurs in the second order (i.e., twice the rotational frequency of the engine). Furthermore, there is rotational nonuniformity at higher orders, as well as stochastically occurring nonuniformities. The internal combustion engine can be, e.g., a two-stroke or a four-stroke engine with an even number of cylinders (e.g., 2, 4, 8, 10, 12 cylinders, etc.) or an odd number of cylinders (1, 3, 5, 7, 9, 11, etc., cylinders) (which may operate by the Otto or the Diesel principle). In theory, it can also be a different kind of internal combustion engine, such as a piston engine with external combustion (so-called Stirling engine). Another possibility is a rotary engine (e.g., a Wankel engine), in which at least the gas forces can produce rotational nonuniformity. Moreover, one can consider turbines, especially gas or steam turbines. Although the rotational nonuniformities in these are generally slight; the invented system can also be extremely beneficial for applications in which especially good true running is needed.

But the invented system is not only suitable for active reduction of rotational nonuniformity produced by a drive assembly (e.g., that of a motor vehicle, a rail vehicle, or a ship), as is the case in the above-mentioned examples. Rather, it can also deal with rotational nonuniformity arising in a power train—i.e., between the drive assembly and the takeoff point, through universal joints, three-dimensional shaft vibrations, or gear wear, for example.

A drive system could also be outfitted with several of the invented systems for active reduction of rotational nonuniformity, e.g., a first system in a motor vehicle could act directly on the crankshaft of the drive assembly (internal combustion engine), while a second system downstream from the coupling, e.g., between coupling and transmission, serves to reduce rotational nonuniformity of the drive train.

An "electric machine" is any kind of machine for rotational movement, which can be operated as both an electric motor and an electric brake, or a generator if necessary.

In theory, the coupling of the electric machine to the shaft can be indirect, e.g., through a transmission. Preferably, however, the coupling is direct, in which, for example, the rotor of the electric machine—similar to a flywheel—is mounted directly on the shaft or perhaps an extension of the shaft that can be coupled in.

By "rapid variation" is meant a variation in the frequency range of the rotational nonuniformity being reduced, i.e., for the second-order rotational nonuniformity at a rotary speed of 3000 $min^{-1}$ a variation with a frequency of 100 Hz. On the contrary, the superimposed torque generally varies slowly or is constant—apart from possibly steep edges at the beginning or end of the superpositioning.

It has been recognized that, in the above-mentioned state of the art, the generation of an on-average nonvanishing additional torque comes at the expense of the quality of the reduction of rotational nonuniformity. For the prolonged or shortened torque segments obtained by lengthening or shortening the time windows generally do not coincide in their form and duration with the apparently lengthened or shortened positive or negative rotational nonuniformities which one obtains by shifting—in thought—the zero line of the rotational nonuniformity. Thus, the lengthened or shortened driving or braking action of the electric machine is no longer optimally adapted to the time course of the rotational nonuniformity and, therefore, no longer optimally suited to reducing such. This effect becomes all the greater as the nonvanishing additional torque is larger; at the limit of a permanent duty as motor or generator, the rotational nonuniformity reduction effect would completely disappear. Therefore, in practice—if one wishes to achieve at least a certain reduction effect—one must maintain a great distance from this limit case. Thus—besides the disadvantage of a nonoptimal reduction effect—only a relatively small portion of the torque which can be achieved with the electric machine is available for generating a nonvanishing additional torque. In other words, only a slight "stroke" is available for generating the additional torque.

In order to arrive at the invention, it was further recognized that the reduction of rotational nonuniformity and the generation of the additional torque must be decoupled from each other in order to achieve an optimal reduction effect and a large possible stroke.

The solution consists—as mentioned—in controlling the electric machine in such a way that, in addition to the rapidly varying torque for reduction of rotational nonuniformity, it generates a superimposed additional torque in the desired direction and strength. The superpositioning of the two torques is additive with respect to the amplitude of the torques. Contrary to the control by changing the timing relationships (as in the state of the art), the superpositioning with the additional torque increases or decreases the respective maximum or minimum overall torque. This, on the other hand, remains unchanged in a timing relation control; an additional torque arises only when averaged over time, as a result of the time windows of different length. Through the superpositioning of the two torques according to the invention, the rapidly varying torque is practically unchanged in its curve shape as a function of time, but is only shifted relative to the zero line. As an exception, the curve shape of the rapidly varying torque changes only when the engine in fact shows altered rotational nonuniformities as a result of the load change accompanying the connecting in of the additional torque. Such a change in the curve is thus no artifact of the superpositioning, but rather caused by an actual change in the rotational nonuniformity being reduced.

Thus, the system according to the invention has the following advantages:

it allows a completely independent adjustment of rapidly varying torque and additional torque and is thus easier in its control engineering;

it provides an optimal reduction of rotational nonuniformity, regardless of whether it is producing additional torque or which kind;

a large additional torque stroke can be achieved (namely, in general, the maximum achievable machine torque, reduced by the amplitude of the rapidly varying torque).

Basically, the electric machine can be controlled such that it either counteracts only rotational nonuniformities toward speeding up (so-called positive rotational nonuniformities) or those toward slowing down (so-called negative rotational nonuniformities). However, especially effective is a method in which it counteracts both negative and positive rotational nonuniformities, i.e., it generates a rapidly alternating torque (Claim 2).

If the additional torque being furnished at the moment is smaller than the amplitude of the rapidly alternating torque at that time, the combined torque of the electric machine shows alternately positive and negative values—albeit shifted with respect to the zero line. In general, the shifting of the alternating torque relative to the zero line also produces a change in the relative times in which the electric machine provides driving and braking action. Yet contrary to the state of the art, this shifting also accomplishes a change in the magnitudes of the driving and the braking moments. If the additional torque is greater than the amplitude of the alternating torque, the overall torque is either only positive or only negative, and this magnitude contains a rapidly varying component (Claim 3). Such an operating state cannot be achieved with traditional timing relation control.

A negative additional torque can also serve to make the electric machine during the reduction of rotational nonuniformity act as a generator for current supply and/or produce or sustain a braking of the vehicle and/or reduce the slip of a drive wheel by braking, perhaps as part of an antislip control (Claim 4). An additional braking torque can also serve to make the electric machine diminish the coupling slip during electromagnetic coupling function and/or perform a braking synchronizer function. The drive wheel slip can also be reduced by increasing the clutch slip, instead of by braking. The braking energy (additional torque brake energy) obtained when using these brake functions as a generator can be saved up—like that resulting from rotational nonuniformity—(for example, in an electrical accumulator or in a flywheel accumulator) and later used as drive energy or be furnished to a power grid or, for example, the vehicle's battery. In order to achieve the highest possible efficiency of brake energy recovery when braking the vehicle by means of the electric machine, it is advantageous to separate the electric machine from the engine by means of an intervening, e.g., mechanical coupling during braking.

An additional positive torque can carry out a braking synchronizer function or sustain (when the electric machine functions as a "booster") or produce an acceleration of the vehicle, for example, to cover acceleration gaps, as in the case of a turbocharged engine (Claim 5).

Advantageously, the electric machine is a rotary-field or traveling-wave machine (Claim 6). By "rotary-field machine"—in contrast with a commutator machine—is meant a machine in which a rotary magnetic field occurs. This can be, for example, an induction or synchronous machine, especially for three-phase current, or a machine with electronic commutation. In a rotary-field machine, the magnetic field sweeps through a complete 360° revolution, while in a traveling-wave machine it only sweeps through one or more segments. Thus, for example, the traveling-wave machine can be an induction or synchronous machine whose stators extend only across one or more sectors of the rotor—resembling one or more curved linear motors.

The drive system preferably has at least one invertor for generating the voltages and/or currents of variable frequency, amplitude and/or phase required for the magnetic fields of the machine, as well as at least one control device, which controls the invertor and, thus, the electric machine in such a way that the machine generates the rapidly varying torque, with superimposed positive or negative additional torque when needed (Claim 7). The invertor can generate the voltages and/or currents needed for the magnetic fields (in particular, rotary or traveling fields) with any desired (within certain limits) frequency, amplitude or phase, or any desired combination of these quantities. It can do this advantageously by means of electronic switches from a predetermined dc or alternating voltage or a predetermined direct or alternating current (so-called pulse invertor). To special advantage, all three quantities—frequency, amplitude and phase—are freely selectable. An invertor drive generally has the advantage of effectively reducing the most diverse rotational nonuniformity with high variability during the most diverse operating conditions and almost totally suppressing it in many instances, being able to easily produce a desired superpositioning of an additional torque with the desired strength.

In order to achieve the highest possible overall efficiency of the drive system, the energy obtained when reducing a positive rotational nonuniformity (rotational nonuniformity brake energy) is advantageously at least partially saved up and the stored braking energy is at least partially used later on to reduce a negative rotational nonuniformity (Claim 8).

The saving of the rotational nonuniformity brake energy and possibly the additional torque brake energy can be done in particular by an electrical accumulator and/or a mechanical accumulator (flywheel accumulator): the electrical accumulator can be, in particular, a capacitance, an inductance and/or a (fast-acting) battery. The invertor (if present) can advantageously be an intermediate-circuit invertor, whose intermediate circuit has at least one electrical accumulator for brake energy or is coupled to at least one such accumulator. The accumulator can either serve exclusively for the accumulation of brake energy (in this case, it will be switched in generally in addition to a normally present intermediate accumulator, which can furnish the necessary voltage or current pulse during the invertor's operating cycle), or it can serve only partially for the accumulation of the brake energy, i.e., save up yet other energy—which may be needed for the operating cycle (in the latter case, it could coincide with the usual intermediate-circuit accumulator). Moreover, it may be advantageous in any case to design the rectifier as an intermediate-circuit rectifier—for example, even without intermediate accumulation of brake energy.

By an "intermediate circuit" is meant a circuit which can supply essentially dc voltage or direct current, from which an invertor component (the so-called machine invertor) can form variable alternating voltage or current by pulse or cycle operation. This dc voltage or direct current must provide voltage pulses with extreme edge steepness and at high voltage level. Generally speaking, an intermediate-circuit invertor comprises three subassemblies, namely, an input subassembly for supplying or taking away electrical energy, an output subassembly in the form of the machine invertor, and the intermediate circuit which comes between these.

In the case of a flywheel accumulator, the flywheel can preferably be electrically coupled to the system by a (second) electric machine. This can be, for example, a rotary-field or commutator machine controlled by its own rectifier. The electric machine for reducing the rotary nonuniformity and the flywheel machine work in opposite cycle: when the former is braking, the latter is accelerating the flywheel, and when the former is driving or not braking so much, the latter is braking the flywheel. Relatively high energy densities can be built up with such a flywheel energy accumulator.

The (first) electric machine in addition to the active reduction of rotational nonuniformity can also perform other functions at the same time or staggered in time and thus replace machines which are traditionally specialized in these functions. In particular, it can also have the function of a starter, e.g., for the internal combustion engine coupled to the shaft (Claim 9). In addition—as already mentioned—it can have the function of a generator for electricity supply, e.g., to charge a battery or energize a power grid. During the starting process, it is generally not necessary to reduce rotational nonuniformity; for this, the electric machine will be operated temporarily as a pure electric motor. It works preferably as a direct starter, i.e., it is directly coupled or can be coupled to the drive shaft of the internal combustion engine and is configured such that it can start the engine by merging in from standstill (this is hereafter also termed "direct starting"). Advantageously, the rotor of the electric machine sits on the drive shaft or on an extension (possibly decoupleable from it). It is preferably firmly coupled or coupleable to the drive shaft. The rotary speed of the rotor is preferably equal to the rotary speed of the internal combustion engine. On the other hand, the generator function is generally also desirable when reducing rotational nonuniformity. Averaged out over time, a gain in electric energy is achieved by superimposing the rapidly varying torque with a simultaneously braking torque.

For the supplying of high-power consumers, such as auxiliary machines (air conditioners, servo-drives, pumps) and heating systems it is advantageous that the electric machine furnish current at relatively high voltage level, preferably in the upper part of the low voltage region, where no special electrocution protection measures are necessary (e.g., around 60 V dc voltage). If one goes beyond this, a range of 250–450 Volts is preferably selected. Advantageously, the high-power consumers are operated or heated electrically (instead of mechanically, as heretofore, or by using waste heat) at these high voltage levels (Claim 10). Such high voltage levels can already exist, in particular, in the intermediate circuit of an intermediate-circuit invertor, and thus need not be specially generated for this additional purpose. For low-power consumers, a traditional low-voltage network (12 V or 24 V) can be provided.

The active reduction of rotational nonuniformity—as mentioned—is based on the fact that the electric machine can counteract positive and negative rotational nonuniformity, and thus acts as a brake for positive and/or as a drive for negative rotational nonuniformity. For this, the control device requires information about the time and possibly the magnitude of a positive or negative rotational nonuniformity.

One possibility of obtaining this information lies in a measuring of the momentary rotational nonuniformity or another quantity connected to it. If the operation of the electric machine is based on this information, we have an automatic (feedback) control, since the actual presence of a rotational nonuniformity leads to an immediate action on this rotational nonuniformity.

Another possibility is to use not the actual, but rather an expected rotational nonuniformity as information for operating the electric machine. Thus, we have here a (nonfeedback) control. For example, in an internal combustion engine, one can determine the magnitude and direction of the momentary rotational nonuniformity as a function of the (crank) shaft angle and one or more operating parameters (such as rotary speed and throttle valve position) by using a prototype or simulation on a computer and outfit each mass produced engine with this information saved in the form of a characteristic diagram. During operation, the system then measures the momentary crankshaft angle present and the other operating parameters (such as rotary speed and throttle valve position), reads the corresponding memorized diagram values for magnitude and amplitude of the anticipated rotational nonuniformity, and controls the electric machine through the control device in order to counteract the rotational nonuniformity.

Furthermore, an adaptive control is possible, i.e., a (nonfeedback) control in which the control information is not fixed, but rather defined or at least modified by measuring earlier rotational nonuniformities.

Moreover, mixed forms of the mentioned kinds are possible, e.g., the expectation values memorized in a characteristic diagram may be adaptive with respect to an anticipated quantity (such as the amplitude), while they can be fixed with respect to another expected quantity (say, shaft angle). Also, a very advantageous combination is an automatic control with servocontrol, in which the automatic control in each control interval is first adjusted to an expected rotational nonuniformity value from a characteristic diagram (servocontrol) and then works off the generally slight deviations between the actual value and the preset value (automatic control). This type of control provides a very fast and exact regulation with relatively low expense. It may also be advantageous to work with automatic (feedback) control at low speeds (e.g., idling), and to switch to open-loop (nonfeedback) control at higher speeds.

In automatic control, adaptive open-loop control, and corresponding mixed forms, the metered quantity need not immediately be the rotational nonuniformity (possibly derived from a measurement of the angle position or angular velocity as a function of time). Instead, it can also be one (or more) other quantities which allow a conclusion as to at least some of the rotational nonuniformities occurring. In an internal combustion engine, this quantity can advantageously be the gas pressure in one or more engine cylinders. For the gas pressure is a major variable source of rotational nonuniformities. Furthermore, another important, practically unchangeable source should be taken into account—the mass forces. Their magnitude can be permanently saved in a characteristic diagram. As an alternative (or supplement), the momentary torque of the engine can be measured, e.g., by means of a torque hub. Thus, using the gas pressure and/or the momentary torque as a metered quantity enables a relatively simple and fast automatic control, adaptive open-loop control, or corresponding mixed form.

The electric rotary-field machine or traveling-wave machine of the drive system is preferably an induction machine, a synchronous machine, or a reluctance machine, especially for three-phase current. An induction machine generally has a relatively simple rotor (generally a rotor with short-circuit windings or windings whose ends go to slip rings). On the other hand, synchronous machines have rotors with distinct magnetic poles, e.g., permanent magnets or electromagnets, which are generated by or current. Reluctance machines belong to the synchronous machines in the broad sense. In particular, the control of the electric machine in the case of the induction machine is preferably based on a field-oriented automatic control (so-called vector control). Starting with directly measurable momentary quantities, such as the imposed voltage, stator current, and perhaps rotary speed, using a computerized dynamic machine model, the stator current is broken down into a torque-forming component, which generates the torque with the rotor flux, and a component perpendicular to this, generating the machine flux, thus determining the torque.

The system for active reduction of rotational nonuniformities is generally an auxiliary system, which is arranged, for example, in the drive train of a motor vehicle with an internal combustion engine as the main system. Because of its auxiliary nature, it should take up little space relative to the main system and therefore should be as compact as possible. The advantageous measures mentioned hereafter serve such a compact construction—besides other advantageous purposes.

One step for achieving good compactness is for the electric machine to have a fine pole division, in particular, at least one pole per 45° angle of the stator. In a full-circle (360°) machine, this corresponds to a total of at least 8 poles.

Even smaller polar divisions are especially advantageous, corresponding to 10, 12, 14, 16 or more poles in the closed-circle machine. A fine polar division allows the stator winding heads to be small, both in the axial and the peripheral direction of the machine, so that the machine can be shorter overall in the axial direction. Also, with a finer pole division, the stator back for the return magnetic flux can be thinner (and, thus, also lighter), with the result that the rotor can have a larger diameter for the same outer diameter of the machine. A larger rotor diameter leads to a larger torque, on account of the longer air gap in the peripheral direction and the larger active lever arm. Thus, on the whole, a finer pole division leads to a lighter and more compact machine. In addition, the resistive losses are less on account of the shorter length of the winding wires—smaller winding heads require less nonactive winding wire. Since, moreover, the stray field (which essentially determines the reactive power component) depends on the winding head surface, it is relatively slight for a fine pole division. A slight stray field is especially advantageous for reducing the rotational nonuniformity, because in this case—unlike a conventional electric machine—there is an ongoing alternation between engine and generator operation and reactive power must be continuously consumed with the corresponding pole reversal.

Fine pole divisions are not customary for high-speed rotary-field machines, since they result in a relatively high frequency of pole reversals. A customary value for the pole reversal frequency is 120 Hz, for example. The electric machine used in the context of the invention, on the other hand, advantageously has a high maximum pole reversal frequency, preferably between 300 and 1600 Hz or more, especially preferably between 400 Hz and 1500 Hz.

In order to lessen the influence of eddy currents in the stator—which increase with higher pole reversal frequency—the stator preferably has thin stator plates, preferably with a thickness of 0.35 mm or less, especially preferably 0.25 mm or less. As a further measure for diminishing the losses, the stator plates are preferably made from a material with low remagnetization losses, especially less than 1 W/kg at 50 Hz and 1 Tesla.

As a further measure contributing to a compact construction, the electric machine preferably has an inner fluid cooling. The fluid can be preferably oil. A very effective cooling technique consists in placing the machine entirely under oil in the interior. However, a disadvantage of this is that turbulence losses occur above around 500 rpm, and these can take on noticeable extent above roughly 2000 rpm. In order to counteract this, the supply of cooling fluid is preferably dependent on the loss power and/or rotary speed, and the fluid cooling is preferably a spray fluid cooling. There is then always only as much cooling fluid in the machine as is required at the time to carry away the loss power.

Quantitatively, the compactness can be expressed in terms of the "torque density." Preferably, the electric machine has a high torque density—as compared to the maximum torque—which is especially preferably greater than 0.01 Nm/cm$^3$ (Claim 11).

Radial vibrations can also often occur on a shaft with rotational nonuniformities, especially crankshafts of internal combustion engines. In order to be robust to radial vibrations, the system is preferably designed such that the electric machine works far into the region of magnetic saturation. A measurement of the magnetic saturation is the current coverage (at maximum torque) in the stator per centimeter length of the air gap in the peripheral direction. Preferably, this measure amounts to at least 400–1000 A/cm, especially preferably at least 500 A/cm. Operation far into the saturation range makes it possible to design the machine with relatively broad air gap. Changes in the air gap—such as occur during radial vibrations—have little effect, due to the operation in the saturation range.

Such a compact-construction electric machine generally has relatively low inductance. Yet in order to achieve, for example by means of a synchronized voltage, the most precise sinusoidal current to generate the electrical rotary fields or traveling waves, the invertor here preferably works at least sometimes with a high cycle frequency, in particular, 10 kHz to 100 kHz or more. This provision is also advantageous for achieving a high temporal resolution for the system; for example, with a cycle frequency of 20 kHz, one can achieve a temporal resolution in the torque behavior of the electric machine of 2 kHz, with which one can effectively reduce a rotational nonuniformity at 200 Hz (200 Hz corresponds, for example, to the fourth order at 3000 rpm). A high cycle frequency, moreover, also contributes to a compact construction for the invertor itself, since it allows smaller intermediate circuit capacitors, which can be placed directly next to the electronic switches with short conductor pathways. Moreover, EMC (EMC: electromagnetic compatibility) filters of the invertor can be smaller.

As a further advantageous provision for achieving a compact construction of the invertor, electronic switches of the invertor are fluid-cooled, preferably boiling bath cooled. As the boiling bath coolant, one can use a fluorohydrocarbon, for example. In boiling bath cooling, the coolant evaporates at hot spots and in this way obtains its relatively high heat of evaporation from them. The vapor rises and can condense, for example, in an external cooler, thereby surrendering its heat of evaporation. This cooling technique enables the most compact arrangement of the electronic switches of the invertor without any cooling body. Furthermore, it has the advantage that relatively slight temperature differences are enough to achieve even high cooling performance, namely, e.g., a difference of 2–10° C., as compared to 40° C. for air cooling. Another advantageous cooling technique consists in connecting several electronic switches of the invertor, especially 2–20 or more, in parallel. The parallel circuit yields a distributed arrangement of heat sources and, thus, a relatively low loss power density.

The invertor preferably contains semiconductor elements as switches, preferably fast semiconductor switches, such as field effect transistors—especially preferably metal oxide semiconductor (MOS) field effect transistors, bipolar transistors, and/or bipolar transistors with insulated gate connection (IGBTs). By "fast" semiconductor switches are meant, in particular, ones which allow maximum clock frequencies of 10–100 kHz or more.

The invertor generates the voltages and/or currents necessary for the magnetic fields of the electric machine, preferably through pulses, especially on the basis of pulse width or pulse amplitude modulation. With constant intermediate circuit voltage, nearly sinusoidal currents of arbitrarily adjustable frequency, amplitude, and/or phase can be generated by sine-evaluated pulse width modulation at high clock frequencies, thanks to the machine inductance. In pulse amplitude modulation, one starts, for example, with an invertor with variable intermediate frequency voltage and thus generates pulses of different amplitude.

In order to identify the instantaneous angular position of the shaft at any time in the system, the electric machine or the shaft is advantageously outfitted with a rotor position or shaft position pickup. From the information on the instantaneous angle position, a conclusion can be drawn as to the instantaneous angular velocity and acceleration and, thus, the instantaneous rotational nonuniformities. In an automatic control system, the reduction of the rotational nonuniformity can be based on this information—as explained above. In an open-loop control system, the information on the instantaneous angle position and possibly the instantaneous mean rotary speed is used to read out the correct expectation value from the characteristic diagram. To obtain the most precise angle position information possible, a rotation transformer (so-called "resolver") can be used in particular, i.e., a transformer with translation ratio dependent on angle. High-resolution encoders can also be used for this purpose, e.g., a combination of a high-resolution incremental pickup and a simple absolute pickup.

Traditionally, one uses friction-closing couplings in drive systems of motor vehicles, which allow a starting of the vehicle with torque conversion ("grinding clutch") in the starting phase. An additional task is to allow a gear shifting by separating the drive assembly from a shift transmission and subsequent reconnection with a friction-operated rotary speed adjustment of drive assembly and transmission. Moreover, hydrodynamic couplings, some of them with transformer function, are known.

Instead of or in addition to such couplings, the electric machine can advantageously be configured such that it acts as an electromagnetic coupling in the drive train and/or as an active synchronizing device or as a portion thereof (Claim 12). For this, one can couple, for example, the drive shaft coming from the engine with the rotor and the takeoff shaft leading to the transmission with the stator, which is here mounted so that it can rotate (or with assignments of rotor and "stator" reversed). In an "electromagnetic coupling," the transmission of torque occurs through the coupling by electrical, magnetic, or electromagnetic forces. It is possible for this type of force transmission to occur only temporarily, for example, after achieving the same rotary speed for the shafts being coupled the force transmission can be taken over by a mechanical coupling. The machine corresponds, e.g., to a normal machine with rotor and stator, wherein the machine can turn as a whole in addition to the rotor's rotation. The rotating machine can generate positive and negative relative torques between rotor and "stator". In this way, the clutch slip can be switched on and off, as with a traditional clutch, and an active acceleration or braking of the shaft leading to the transmission can be achieved for purposes of transmission synchronization. The electric machine acting as a coupling can be used to dampen vibrations, namely: 1) with the takeoff shaft restrained from turning, for dampening at the drive end, and 2) or else by adjusting a clutch slip varying with the rotational nonuniformity to isolate vibrations of the takeoff end from the drive end.

The electromagnetic coupling function can also be used advantageously for a modified form of starting. In fact, relatively large torques need to be provided for direct starting of the drive assembly. As an alternative, for the case of small torque not sufficient for this, the electric machine can be advantageously designed as a gyrating mass starter with electromagnetically coupled gyrating mass. The gyrating mass is advantageously the rotor or the "stator", together with the connecting shaft leading to the transmission. With the gear disengaged, this can be run up to high speed as an electric motor, buttressed by the inertia of the drive shaft and the compression of the engine. By electromagnetic coupling with the electric machine itself, the gyrating mass is quickly braked, thus accelerating the drive shaft such that the engine turns over. The advantage over known flywheel starters with mechanical coupling in of the flywheel (see, e.g., D. Henneberger "Electrical Engine Equipment", Braunschweig 1990, pp. 98–103) is the avoidance of clutch slip and the precise controllability of the coupling in process.

The electric machine can also serve for drive slip regulation (ASR). Regulation of the drive slip—in the state of the art—is accomplished in that, when a limit value of drive slip or a time change (time derivative) of the drive slip is attained, the driving moment is reduced. Reduction of the driving moment is implemented either by adjustment of the engine, i.e., by throttle valve adjustment or by ignition time adjustment, or by activating one or more wheel brake(s). A combination of both measures is also known. In particular, in addition to the engine adjustment, which occurs when a first limit value of the drive slip is exceeded, the wheel brakes can be activated when a second, higher limit value of drive slip is attained. Such regulating systems, on the one hand, are relatively sluggish, and on the other relatively hard to control, i.e., a particular time course of the drive torque reduction can almost never be achieved.

According to an advantageous configuration, the electric machine serves to regulate drive slip and is designed such that it can produce a drive slip reduction by additional torque, say, by reducing the driving torque (of the drive assembly), in particular, by brake action and/or—when the electric machine is working as a coupling—by coupling slip action.

The invention is also addressed to a method of active reduction of rotational nonuniformities of a shaft, especially the drive shaft of an internal combustion engine or a shaft coupled to or which can be coupled to it, with at least one electric machine, which is coupled or can be coupled to the shaft, wherein the electric machine is controlled such that it generates a rapidly varying torque, and it superimposes on this a positive or negative torque in order to further achieve a driving action or braking or generator type action (Claim 13).

The method can advantageously be carried out with a drive system according to one or more of the above-explained configurations. As regards individual features and advantages of the method, we refer to the above explanations on the system, which also pertain entirely to the method in its various configurations.

The subjects of Claims 2, 6–12 and the specification can also be advantageous in a system and a method for active reduction of rotational nonuniformities, in which the electric machine does not superimpose any additional torque. Therefore, we reserve the right to orient patent claims to these subjects, omitting the complex of features in this regard presently contained in Claims 1 and 13.

Furthermore, in all of the present specification, numerical indications "x" shall be understood in the sense of "at least x," and only preferably in the sense of "exactly x."

In the figures, parts essentially identical in function bear the same references.

FIG. 1*a* shows (by solid line) the rotary speed n of a shaft as a function of the crankshaft angle__. The shaft periodically executes speed fluctuations toward smaller and larger speeds about a mean speed (here, 3000 revolutions per minute), which in this idealized example have a basically sinusoidal appearance. The shaft is, for example, the crankshaft of a four-cylinder, four-stroke internal combustion engine of a motor vehicle, having in the second order (i.e., at a frequency of 100 Hz) a relatively large rotational nonuniformity resulting from the gas and mass forces. As an illustration, the angle interval needed for one revolution of the shaft is also indicated. In general, rotational nonuniformities of higher orders and those of stochastic nature also occur on a shaft (not shown here). Thus, their appearance is generally not sinusoidal.

There are fluctuations in the torque Mv of the engine about a mean torque, basically proportional to the rotational nonuniformities. The solid line in FIG. 1a also illustrates the curve of the engine torque Mv as a function of the crankshaft angle φ.

Figure 1B:
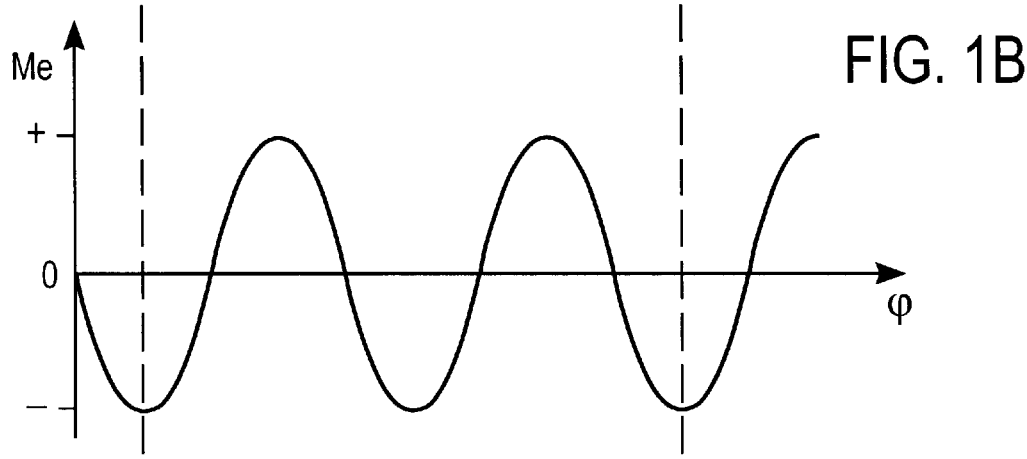

FIG. 1b shows the total torque Me as a function of the shaft angle φ, which is applied by an electric machine coupled to the shaft. The curve of the machine torque Me largely corresponds to that of the rotational nonuniformity and the engine torque Mv, but is opposite in direction. The curves are essentially opposite in phase, that is, when there is a rotational nonuniformity toward higher speed (so-called positive nonuniformity), the electric machine generates a torque to brake the shaft (so-called negative torque), whereas in the case of a rotational nonuniformity toward lower speed (so-called negative nonuniformity) it generates a driving torque (so-called positive torque). The magnitude of the torque Me is chosen such that the rotational nonuniformity—and the fluctuation of the torque Mv proportional to it—is substantially reduced or even virtually disappears through its action, as is illustrated in FIG. 1a by the broken line.

In the mode of operation shown in FIG. 1b, the negative and positive torque extrema are equal in magnitude. Thus, the energy obtained during a braking phase is essentially equal to the energy used up in the following drive phase. Therefore, the outward energy flux is zero, and brake energy is only buffered temporarily inside the system. Thus, the system in this operating mode works like a pure rotational nonuniformity reducer with rapidly varying torque, without generating an additional torque.

Figure 1C:
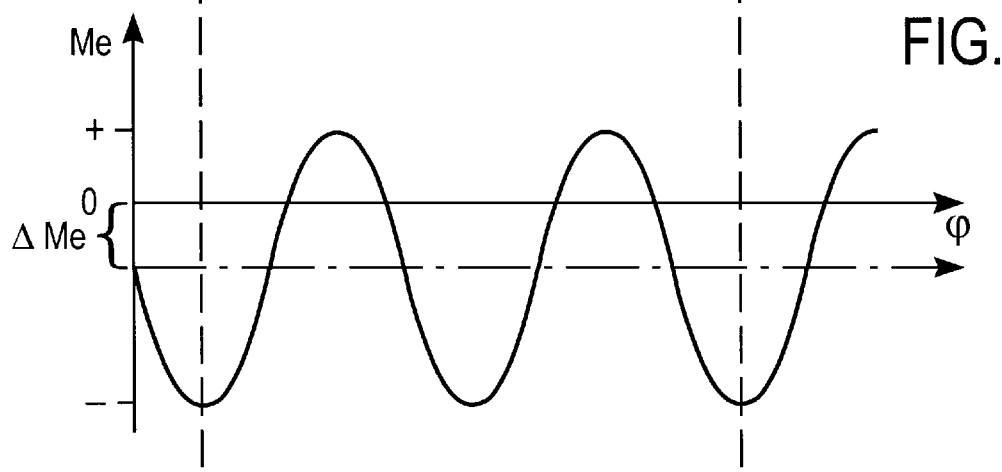

An example of an operating mode of the system modified from the preceding one, with an additional torque, is shown in FIG. 1c: The time course of the total torque Me corresponds to that of FIG. 1b, but it is shifted overall by a particular amount ΔMe (the so-called deviation) in the negative direction. The deviation ΔMe will generally vary slowly, but in the brief time frame represented here of approximately one period of rotation it is constant to a good approximation. The deviation Me here is smaller than the amplitude of the rapid variation of the torque, so that the overall torque Me alternately takes on positive and negative values. Averaged over the rapid torque variation, one obtains a constant torque ΔMe. Thus, on average, mechanical energy is withdrawn from the internal combustion engine, being largely transformed into electrical energy and taken out of the system. The electrical machine in this type of operation thus has the function of an electrical generator, besides the function of a rotational nonuniformity reducer, which can act as a brake and deliver current, e.g., to counterbalance operating losses of the system, to charge the vehicle's battery, and/or to operate electrical consumers.

If the deviation ΔMe is greater than the amplitude for reducing the rotational nonuniformity, the electric machine will only work as a brake and no longer as a drive, and the braking action will vary in magnitude according to FIGS. 1b and 1c, in opposite phase to the rotational nonuniformity.

Both small and very large generator powers can be adjusted simply by an appropriate adjustment of the (software) control system of the electric machine—without any structural (hardware) changes. Only the size of the electric machine is a limitation. Thus, the very same machine type can be used, for example, for small and large vehicle types without design adaptation.

The overall torque curve can also be shifted in the positive direction (positive deviation). The electric machine then works as a (driving) motor, besides its function as a rotational nonuniformity reducer, to support the engine when accelerating the vehicle, for example.

Figure 2:
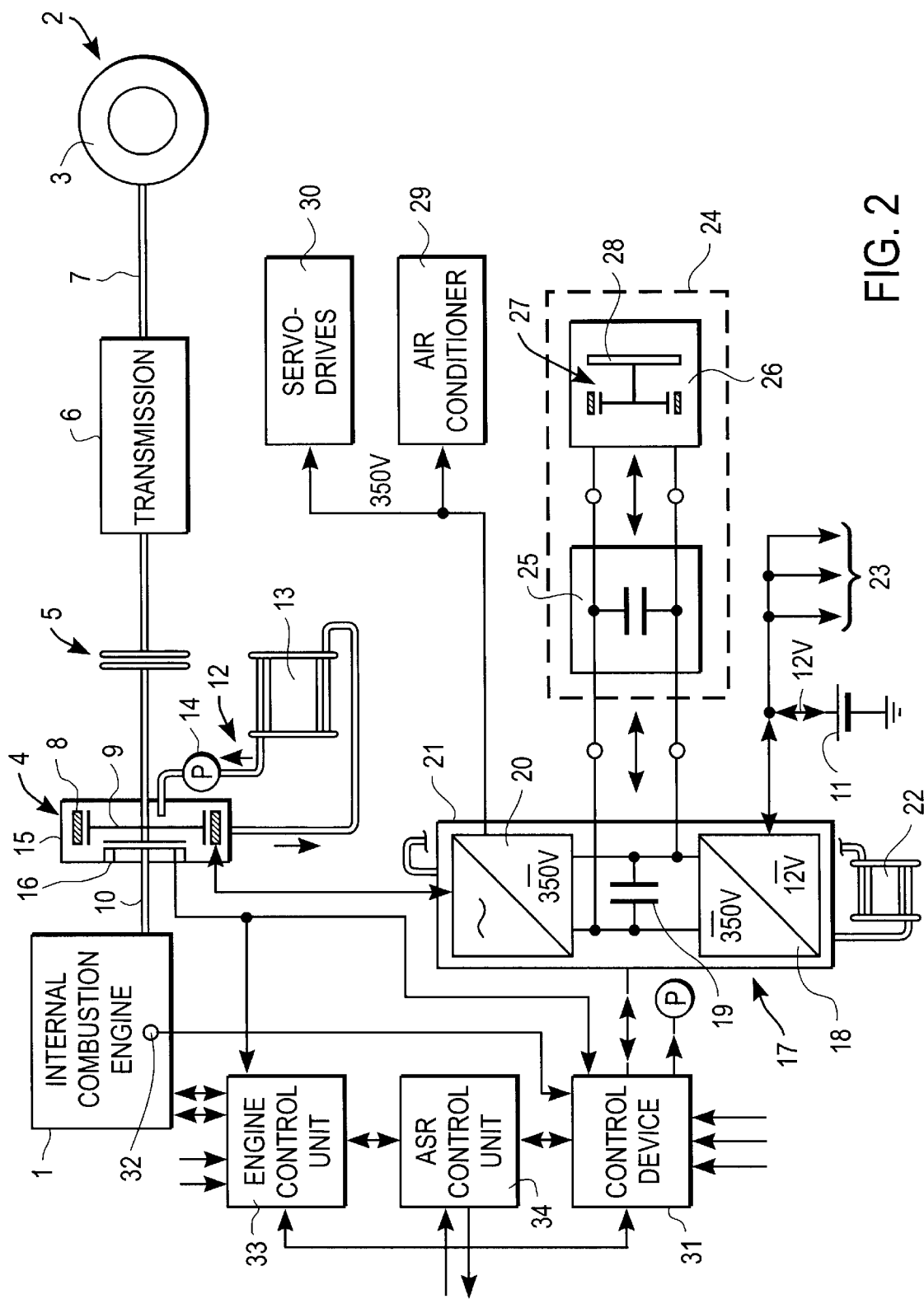
FIG. 2 a not-to-scale schematic representation of one embodiment of the system.

The drive system of a motor vehicle, such as a passenger car, represented in FIG. 2, has as its drive assembly an internal combustion engine 1, which can be a four-cylinder, four-stroke Otto or Diesel motor. The torque produced by the engine 1 can be transferred by a drive train 2 to drive wheels 3. In the takeoff direction, in the drive train 2, there first comes after the engine 1 an electric machine 4. This is followed by a travel coupling 5, a transmission 6, and an axle drive 7, which transfers the torque to the drive wheels 3. The coupling 5 and the transmission 6 can be a frictional clutch and a gearbox; alternatively, for example, an automatic coupling or transducer coupling are possible, each with gearbox or automatic transmission. In other embodiments (not shown), an additional coupling (activated by a control system) is arranged in the drive train 2 between engine 1 and electric machine 4, in order to prevent the engine 1 from following along when braking with the electric machine 4.

The electric machine 4—here, a rotary-current traveling-wave machine in induction or synchronous design—comprises a stator 8 and a rotor 9. The former is stationary and thrusts against the internal combustion engine 1, the vehicle chassis (not shown), or a coupling housing (not shown), whereas the latter sits directly on a drive shaft (crankshaft) 10 of the engine 1 or an extension thereof and is firmly coupled to it. The drive shaft 10 and the rotor 9 thus rotate together, without a gearing coming in between.

The electric machine 4 fulfills several functions: on the one hand, it functions as a rotational nonuniformity reducer, as has already been explained in connection with FIG. 1. On the other hand, it functions as a generator to charge the vehicle's battery 11 and to supply electrical consumers and thereby replaces a dynamo normally present in the motor vehicle. Furthermore, the generator function can serve to brake the vehicle or the engine 1. In addition, the electric machine 4 can function as an additional motor ("booster"), e.g., to support the engine when accelerating the vehicle. It also serves as a starter for the internal combustion engine and thus can also replace a separate starter normally provided in the motor vehicle. Finally, by virtue of the moment of inertia of the rotor 9, it functions as a flywheel and can thus replace the flywheel generally present on the crankshaft in traditional motor vehicles.

The electric machine 4 is cooled on the inside by a spray fluid cooling 12. After going through a cooler 13 and a pump 14, the cooling fluid—here, a suitable oil—is sprayed onto the rotor 9, and this in proximity to its axis of rotation. Because of the rotation of the rotor and centrifugal force, it travels outwardly, thereby cooling rotor 9 and stator 8, and then exits a housing 15 of the electric machine 4, again returning to the cooler 13 in a closed circuit. Depending on the loss power and rotary speed, the flow of coolant is provided by corresponding control of the pump 14, so that each time only just the required minimum of cooling fluid is present inside the housing 15. An equalization vessel (not shown) allows this variation of the quantity of cooling fluid in the housing 15. In other configurations (not shown), the electric machine (or only the rotor) is integrated in a coupling and/or transmission housing and cooled by a lubricating and/or cooling fluid (e.g., clutch or transmission oil) located therein.

Furthermore, the electric machine 4 is outfitted with a rotation transformer 16 (so-called resolver), which preferably has more than eight poles, here, for example, 12 poles. It consists of two adjacent circuit boards, one of which is stationary and the other turns with the drive shaft 10. The circuit boards have windings formed by conductor tracks on their facing surfaces, such that a transformer translation ratio dependent on angle of rotation results. The rotation transformer 16 operates on the transponder principle: The stationary windings (stationary board) are actively loaded with current/voltage and give off electromagnetic energy to the rotating windings (rotating board). The latter radiates a portion of this energy back again, and this portion depends on the angle of rotation, given the angle-dependent transmission ratio. The back-radiated portion generates in the stationary windings a signal dependent on angle of rotation. Evaluation of this signal provides the instantaneous angle of rotation of the drive shaft 10 with a precision of at least 0.5 degrees. In more simple configurations, an incremental pickup is used.

An invertor 17 provides the stator 8 of the electric machine 4, at a very high clock frequency (e.g., 100 kHz), with sine-evaluated pulse width modulated voltage pulses, which under the action of the machine's inductance basically yield sinusoidal three-phase currents, whose amplitude, frequency and phase are freely selectable.

The invertor 17 is a voltage intermediate-circuit pulse invertor and comprises three subassemblies: a dc voltage converter 18 (input assembly), which converts dc voltage from a low level (here, 12 V) to a higher intermediate circuit level (here, 60 V or 350 V) or back again, an electrical intermediate circuit accumulator 19, here, a capacitor or an arrangement of parallel-switched capacitors, and a machine invertor 21 (output assembly), which can generate from the intermediate circuit dc voltage the (synchronized) three-phase alternating voltage of variable amplitude, frequency and phase or—when the electric machine 4 is operating as a generator—can convert any such alternating voltages into the intermediate-circuit dc voltage. In other configurations (not shown), the intermediate circuit level lies at the upper edge of the low-voltage range that is permitted without special electrocution protection, here, 60 V.

The three subassemblies 18, 19, 20 of the invertor 17 are hermetically enclosed in a metal housing 21, which is filled with a suitable boiling type coolant. This is, for example, a fluorohydrocarbon, having a suitable boiling point, e.g., 60° C., at a suitable pressure (say, between 50 mbar and 3 bar). Evaporated coolant can condense in a condensation cooler 22 and return to the housing 21 in liquid form in a closed circuit. The housing 21 with the cooling circuit is hermetically tight.

The dc voltage converter 18 is connected, at the low-voltage side, with the vehicle's battery 11 and various low-voltage consumers 23, such as lighting and electronic devices. The invertor 17, on the one hand, can furnish current at low voltage level for charging the vehicle's battery 11 and supplying the low-voltage consumers 23, and on the other hand it can take current from the vehicle's battery 11 at low voltage level for starting the internal combustion engine 1. In other embodiments (not shown), the vehicle's battery is at an intermediate circuit level and is directly coupled with the intermediate circuit.

The intermediate circuit accumulator 19 is connected to an external additional accumulator 24, which can be an electrical accumulator, here, an extra capacitance 25, and/or a flywheel accumulator 26. The additional accumulator 24 has the primary task of buffering the energy obtained from the rotational nonuniformity reducer in a brake phase and surrendering it again for the following drive phase. In addition, it can also serve to save that energy which accrues during other brake processes mediated by the electric machine 4. Finally, it can take strain off the vehicle's battery 11 when starting the engine 1, since it takes energy only slowly from the battery and saves it in the additional accumulator 24. It is then available here for fast removal during the starting process.

On the other hand, the (inner) intermediate circuit accumulator 19 has the basic task of providing voltage with the necessary steep rise time for clock purposes—i.e., quickly—to the machine-invertor group. It does not need any very high capacitance for this (e.g., it has 2·F), and in fact low lead inductances are more advantageous for speed purposes, which is ensured by the arrangement in the interior of the invertor 17 (and preferably on the same board on which the electronic switches of the machine-invertor 20 are also arranged). The additional accumulator 24, on the other hand, can work relatively slowly, so that the lead capacitances here are not a problem, due to the external arrangement. In particular, the additional capacitance 25 can be 50–10,000 times greater than that of the intermediate circuit accumulator 19 (here, it is 4.7 mF, for example, for furnishing the rotational nonuniformity energy).

Even larger storage capacities can be achieved with the flywheel accumulator 26, which here comprises its own invertor-controlled electric machine 27 and a gyrating mass 28 coupled to it. The latter can be formed by a separate flywheel or be integrated in the rotor of the electric machine 27. The moment of inertia of the gyrating mass 28 is preferably 0.05 to 2 kgm$^2$. It is also possible to store a multiple of the energy needed to start the engine 1 in the flywheel accumulator 26 and quickly remove from it the particular energy needed for starting (i.e., in less than 1 second).

In other configurations (not shown), no separate additional accumulator 24 is provided. Here, the intermediate circuit accumulator 19 is dimensioned and possibly arranged outside the invertor 17 so that it can take on the function of the additional accumulator 24.

The intermediate circuit with its high voltage level (here, 60 V or 350 V) supplies various high-power consumers, such as an air conditioner 29 and servo-drives 30 with electrical energy. Whereas such high-power consumers are traditionally operated by mechanical coupling from the internal combustion engine 1, the high-voltage level available here allows a more efficient, purely electrical powering.

A control device 31, through appropriate actuation of its semiconductor switches, instructs the invertor 17 at each moment of time as to the amplitude, frequency, and phase that the alternating voltage generated by it should have. The control device 31, which can be formed, for example, by a correspondingly programmed microcomputer system, first determines the magnitude and the direction of the torque which the electric machine 4 is supposed to produce at a particular time. It can do this, e.g., by means of a characteristic diagram control system, in that it obtains, as input information from the rotation transformer 16, the angular position of the drive shaft 10, the mean rotary speed at the moment, and possibly other operating parameters, such as the throttle valve position, and it determines from a memorized characteristic diagram the rotational nonuniformity to be expected at the moment, as a function of these operating parameters. Another possibility is to determine the rotational nonuniformity actually existing at the time, for example, by computing the instantaneous rotational velocity on the basis of information furnished by the rotation transformer 16 and/or by evaluating the gas pressures existing in the engine 1 at the time, which can be detected by means of gas pressure sensors 32, and also by picking up the instantaneous torque of the engine 1 by means of a torque hub (not shown) in the drive train. A combination of automatic and open-loop control is also possible. From the value thus determined for the instantaneous rotational nonuniformity, a corresponding (opposite-phase) value is derived for the rapidly changing nominal torque of the electric machine 4, onto which may be additively superimposed a positive or negative additional torque of desired strength. To start the internal combustion engine 1, the nominal torque can be determined on the basis of memorized values, which specify the nominal time curve of the rotary speed or torque of the electric machine 4 during the starting process, perhaps supplemented by a measurement of these quantities and a feedback control, which ensures that the preset values are maintained.

In a second step, the control device 31 determines which amplitude, frequency, and phase of the voltage or current must be provided by the invertor 17 in order for the electric machine 4 to produce this nominal overall torque. This determination is done, in electrical induction machines, on the basis of a field-oriented automatic control, which is based on a model computation for the electric machine 4 and which uses as input information essentially the measurable electrical quantities of the stator (amplitude, frequency and phase of current and voltage) and the instantaneous mean speed of the rotor.

In FIG. 2, the control device 31 is shown as being arranged outside the invertor housing 21. In order to keep the lead inductances low and also participate in the boiling bath cooling, however, it is arranged inside the invertor housing 21 in other configurations (not shown).

The control device 31 shares various sensors serving to carry out its control tasks and sensor information derived from them with a motor control unit 33 to control the engine 1. Specifically, these are, for example, the rotation transformer 16 (angle position pickup), the gas pressure sensors 32, as well as sensors (not shown) for detecting the mean rotary speed, the loading condition of the engine 1 (e.g., through the throttle valve position) and its torque (e.g., through a torque hub).

Furthermore, the control device 31 communicates with a number of other control units: an energy consumption control unit (not shown) indicates how much energy is needed for charging the vehicle battery 11, for supplying the low-voltage consumers 23 and the high-power consumers 29, 30, so that the control device 31 can provide for a corresponding overall thrust adjustment·Me (see FIG. 1c). The motor control unit 33 tells the control device 31 whether the electric machine 4 is supposed to provide acceleration or braking of the vehicle in addition to its vibration diminishing function, so that it can provide a corresponding overall thrust shift·Me and perhaps temporarily switch off the rotational nonuniformity reduction function. Accordingly, an ASR (drive slip control) control unit 34 tells the control device 31, when drive slip is present, that the electric machine 4 should temporarily act as a generator brake, if necessary before the ASR control unit institutes a braking of the particular drive wheels by the wheel brakes as a more massive remedy if the drive slip continues. In addition, the ASR control unit can relay its slip information to the motor control unit 33, to bring about a further reduction in the engine torque.. The motor control unit 33 can also implement an automatic start-stop control and tell the control device 31 whether the electric machine 4 should start the engine 1.

Energy obtained during each type of braking is kept in the additional accumulator 24, to be re-used for subsequent powering of the electric machine 4 or diverted to the vehicle battery 11.

Figure 3:
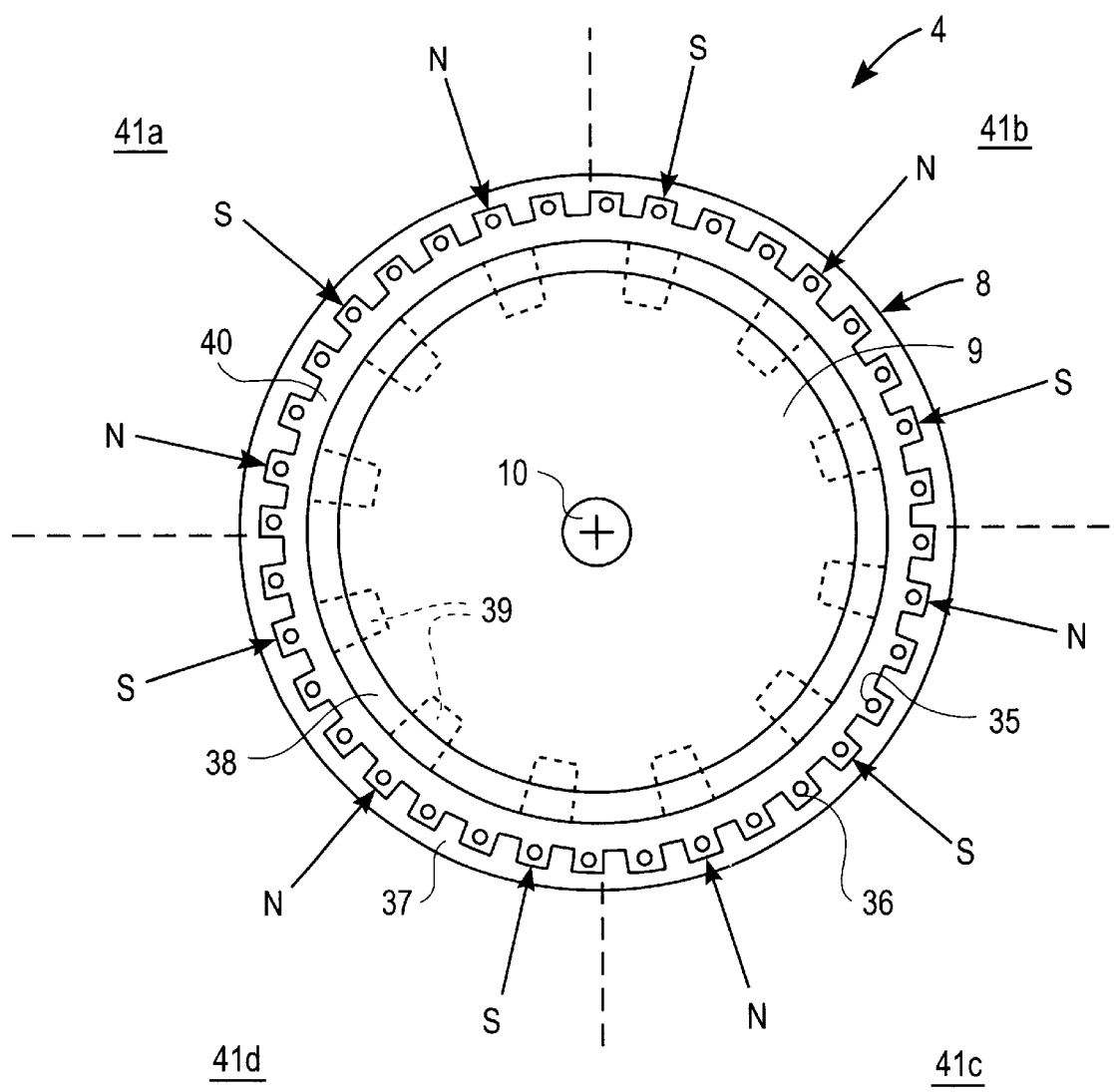
FIG. 3 a schematic cross sectional representation of an electric machine with plane of sectioning perpendicular to the axial direction in order to illustrate various machine types which can be used in the system.

The electric machine 4, shown more closely in FIG. 3, has no brushes or wiper and is thus free of wear. It has an outer diameter of around 250 mm and a length in axial direction of 55 mm and produces a continuous torque of around 50 Nm and a peak torque of around 150 Nm with a weight of 10–15 kg. It can attain rotary speeds corresponding to the peak speed of conventional internal combustion engines (around 6000 to 10,000 rpm) and is speed-resistant up to 14,000 rpm. The electric machine 4 has an exterior stator 8, having grooves 35 in the direction of the drive shaft 10 (axial direction). The stator 8 carries a three-phase winding 36, configured such as to form 12 poles when energized with three-phase current. There are three grooves 35 per pole, and thus a total of thirty-six grooves 35. (In other configurations (not shown), at least six grooves per pole, preferably nine grooves, are present in order to reduce stray effects.) The poles revolve in circular motion in the stator 8 with the rotary-current oscillation. Their momentary position at a particular time is shown by arrows carrying the designations "S" (for south pole) and "N" (for north pole). A back 37 closing off the grooves 35 on the outside is relatively thin in radial direction, its thickness being preferably 3–25 mm (at the location of a groove 35). The stator 8 is constructed from thin plates (the thickness here is 0.25 mm) of a material with low remagnetization losses (here, less than 1 W/kg at 50 Hz and one Tesla), with the planes of the plates being perpendicular to the axial direction.

The interior rotor 9 in the case of the induction machine is fashioned as a squirrel-cage rotor with cage bars traveling essentially in the axial direction, each of them being joined at the end face to a short-circuit ring 38. In the case of the synchronous machine, the rotor 9 carries a corresponding number of poles to the stator 8 (here, 12 poles), which can be formed by permanent magnets or appropriately excited coils. FIG. 3 also shows the synchronous machine, schematically indicating its rotor poles (reference number 39).

The air gap 40 between rotor 9 and stator 8 is relatively large; its width is 0.25 to 2.5 mm, preferably 0.5 to 1.5 mm.

In other configurations (not shown), the rotor is exterior and the stator is interior.

Figure 4:
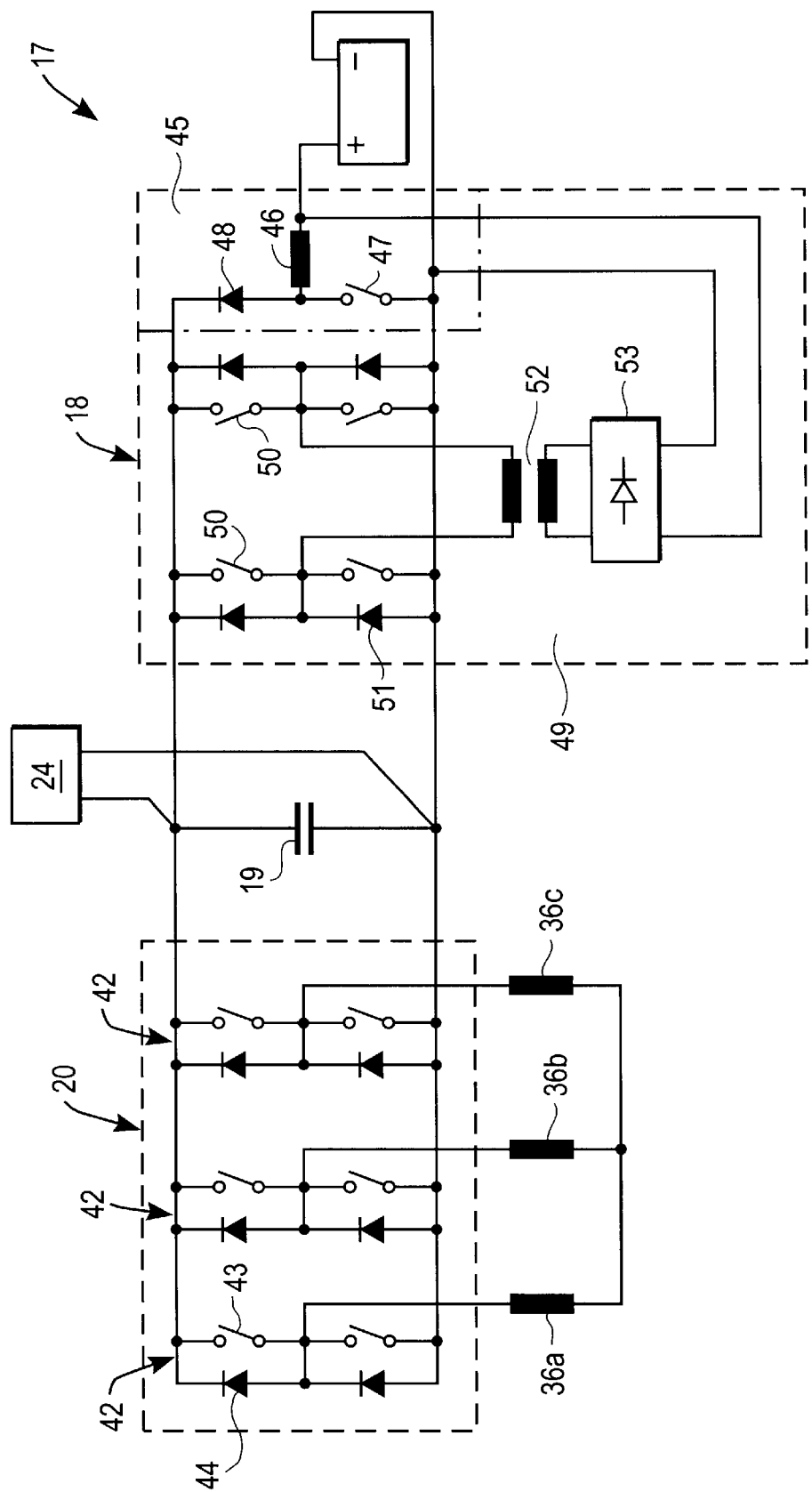
FIG. 4 a schematic circuit diagram of an invertor used in the system.

FIG. 4 shows a schematic diagram of the invertor 17. One recognizes the intermediate circuit accumulator 19 in the form of a capacitor, which is switched in parallel to the additional accumulator 24 (not shown more closely here). The capacitor symbolizes a parallel connection of several capacitors.

The machine invertor 20 is formed by three parallel-connected (but independently engaging) switch groups 42, each of the switch groups 42 being responsible for generating one of the three 3-phase voltages. Each of the switch groups 42 is a series connection of two (independently switching) switches 43 between the plus and the minus pole of the intermediate circuit. The series connection is joined at the center (i.e., between the switches 43) by one side to one of the three windings 36a, 36b, 36c of the three-phase winding 36; at the other side, the three windings 36a, 36b, 36c are joined together.

A free-wheeling diode 44 is connected in parallel to each of the switches 43. It is polarized such that it normally blocks and only when the opposite switch is open does it let through a brief current flow in the other direction, generated by self-inductance.

Each switch 43 symbolizes a parallel connection of several (e.g., five) MOS field-effect transistors, which are directly actuated by the control device 31 to form a three-phase current of desired amplitude, frequency and phase.

The dc voltage converter 18 comprises two subassemblies, namely, one which can bring electrical energy from the low voltage level (12 V) up to the high intermediate-circuit voltage level (60 V or 350 V), and another which can bring electrical energy from the high voltage level (60 V or 350 V) to the low voltage level (12 V). The first-mentioned subassembly can be absent from configurations with vehicle battery arranged in the intermediate circuit.

The first subassembly is, for example, a step-up transformer 45. This is formed by a series circuit of an inductance 46, connected to the plus pole of the vehicle's battery 11, and a switch 47 connected to its minus pole and the minus pole of the intermediate circuit, this series circuit being connected in the middle to the plus pole of the intermediate circuit via a step-up diode 48 (polarized in the conducting direction). When the switch 47 is closed, a circular current flows from the plus to the minus pole of the vehicle battery 11. After opening the switch 47, a self-inductance voltage tries to prevent a collapse of this current, with the result that the high intermediate-circuit voltage level (60 V or 350 V) is temporarily exceeded and current flows through the (otherwise blocking) step-up diode 48 and charges the intermediate-circuit accumulator 19. By periodically opening and closing the switch 47, one achieves a quasistationary charging current, e.g., in preparation of the starting process. The switch 47 is a semiconductor switch, which is directly actuated by the control device 31.

The second subassembly is a step-down voltage transformer 49, for example, which functions similar to a switching power pack. It comprises two series circuits of switches 50 between the plus and minus pole of the intermediate circuit, each of them with parallel-connected free-wheeling diodes 51. The ends of a primary winding of a high-frequency (HF) transformer 52 are each connected to the middle of these series circuits. The secondary winding of the HF transformer 52 energizes a rectifying and smoothing unit 53, which in turn energizes the vehicle battery 11 and possibly low-voltage consumers 23. The switches 50 symbolize semiconductor switches, which are directly actuated by the control device 31. By periodically opening and closing the switches, a high-frequency alternating current can be generated, which induces in the secondary winding of the HF transformer 52 a corresponding alternating voltage at lower voltage level, which is rectified and smoothed out by the unit 53. The exact value of the resulting dc voltage can be precisely adjusted by means of the switch 50, through varying the switching frequency.

Figure 5:
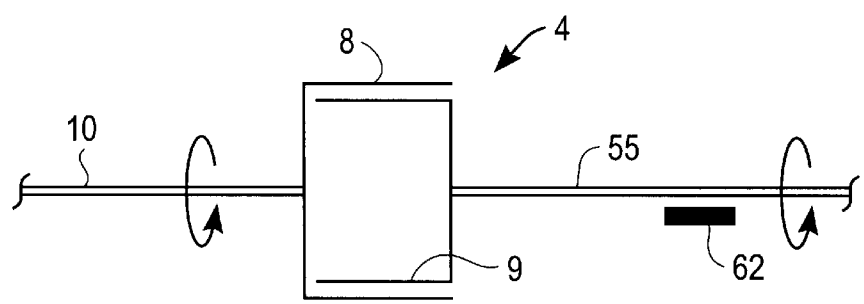
FIG. 5 a schematic representation of an electric machine with electromagnetic operating units that can rotate.

FIG. 5 shows a single electric machine 4, which has the function of an electromagnetic coupling and/or synchronizing device [for] a following transmission. It has an inner and an outer electromagnetic active element, which are termed here the rotor 9 and the stator 8', borrowing the conventional terminology from electrical machines. The rotor 9 is firmly joined to the takeoff shaft 55 and the stator 8' is firmly joined to the drive shaft 10 (in other configurations—not shown—this arrangement is reversed). The electric machine 4 can thus rotate as a whole in addition to the rotor's rotation; the term "stator" should thus be taken only in a transferred sense, seeing that it can rotate. Whereas in a stationary electrical machine—such as a rotary-field machine—it is possible to restrict the current supply to the stationary active element (i.e., the stator) and to produce currents in the rotating active element (i.e., the rotor) without supplying current, by induction alone, in the present case—where both active elements can rotate—current is supplied to at least one of them (here, the stator 8') across rotation-movable electrical connections (e.g., across wiper/slip ring contacts, not shown here). The takeoff shaft 55 can be prevented from turning with a mechanical clutch, here, a brake 62 which is thrust against the vehicle chassis or the transmission housing. The configuration shown has no bridge coupling, but other configurations (not shown) are outfitted with a frictional or nonpositive-locking bridge coupling for the mechanical connection of the shafts 10, 55. The machine 4 can be placed in or on the engine housing, transmission housing, or at any other place in the drive train 2.

The electric machine 4 can perform various functions. In the function as shift coupling and possibly as starting coupling, a synchronism of the shafts 10, 55 is achieved by such an adjustment of the torque-generating magnetic fields of the machine 4 that a uniform rotary speed prevails between the shafts 10, 55, i.e., the coupling slip between stator 8' and rotor 9 precisely vanishes. In an induction machine, this is accomplished, for example, by automatic control or open-loop control of the magnetic slip of a rotary field of suitable frequency and amplitude, turning opposite the direction of the drive torque. A positive-locking bridge coupling (not shown here) eliminates the electromagnetic losses during vanishing coupling slip.

An active transmission synchronization serves to accelerate or brake the drive shaft 55 during a gear change, such that the gears being meshed together have the same peripheral velocities. This function can be implemented in configurations of the single machine 4 even without coupling function. The shaft acceleration or braking is accomplished here by thrusting against the drive shaft 10 turning at the variable speed of the internal combustion engine 1. The contribution of this rotation is taken into account when determining and controlling the relative speed of the machine 4 necessary to the particular synchronization.

A reduction of rotational nonuniformities of the drive shaft 10 can occur with the vehicle at standstill, thrusting against the rotor 9 which is then prevented from turning by means of the brake 62. When moving under power, rotational nonuniformities of the takeoff shaft 55 can be reduced by rapid variation of the transmitted torque with the bridge coupling not engaged (or not present), specifically, by reducing [this torque] (i.e., increasing the clutch slip) for positive rotational nonuniformity and increasing [this torque] (i.e., decreasing the clutch slip) for negative nonuniformity.

Additional acceleration or braking is possible with the bridge clutch not engaged by generating appropriate torques—or in other words—less or more clutch slip. The electric machine 4 can be involved in an ASR control such that when the drive wheel slip is too large the clutch slip is momentarily increased and thus the moment applied to the drive wheels is reduced. A generator function to produce current is achieved by permanently maintaining clutch slip.

The electric machine 4 can start the internal combustion engine 1 directly, by thrusting against the takeoff shaft 55 fixed by the brake 62. In another configuration, when the machine 4 does not provide sufficient torque for this, it can serve as a nonwearing flywheel starter, making use of the electromagnetic coupling function. For this, the electric machine 4 first accelerates, with gear disengaged and brake 62 released, the then free-wheeling rotor 9, along with the takeoff shaft 55, propped against the drive shaft 10 and the compression of the still idle engine 1, up to a relatively high rotational speed, e.g., 2000 rpm. The electric machine 4 is then reversed in a brief time; such that it produces a braking moment, i.e., frictional connection between the rotor 9 and the stator 8'. In this way, the rotor 9 with the takeoff shaft 55 and the stator 8' with the drive shaft 10 are quickly brought to a common mean speed (e.g., 800 rpm) and the engine 1 is started.

What is claimed is:

1. A system for active reduction of rotational fluctuations of a shaft comprising an electrical machine (4), with the electrical machine (4) being controlled in such a way that
   in order to reduce rotational fluctuations, it produces a rapidly varying torque, wherein, if no mean accelerating or decelerating torque is generated, the rapidly varying torque defines a zero line and has a curved shape, and
   superimposes a positive or negative torque, respectively, over the rapidly varying torque to additionally generate a mean accelerating or decelerating or rheostatic braking torque,
   wherein as a result of such superimposition, the rapidly varying torque only shifts with respect to the zero line while maintaining the curved shape; and
   wherein the rapidly varying torque acts in an alternating manner, i.e. by decelerating in the case of a positive rotational fluctuation of the shaft and by accelerating in the case of a negative rotational fluctuation of the shaft.

2. A system according to claim 1 wherein a case a small accelerating or braking/rheostatic braking effect must be achieved, the total torque generated by the electric machine (4) assumes positive and negative values whereas in case the effect to be achieved is greater, it only assumes positive or negative values, respectively.

3. A system according to claim 1 wherein the electrical machine (4) produces a negative torque in order to act as a power supply generator and/or to achieve or support deceleration of the vehicle and/or reduce the slip of a drive wheel as part of an antislip control system by means of deceleration.

4. A system according to claim 1 wherein the electrical machine (4) produces a positive torque to achieve or support acceleration of the vehicle.

5. A system according to claim 1 wherein the electrical machine (4) is a rotating field machine or a traveling field machine.

6. A system according to claim 1 comprising
   at least one inverter (17) to produce the voltages and/or currents with the variable frequency, amplitude and/or phase required for the magnetic fields of the machine (4), and
   at least one control device (31) which controls the inverter (17) and thereby the electrical machine (4) in such a way that the latter produces the rapidly varying torque, if necessary with superimposed positive or negative torque.

7. A system according to claim 6 wherein the inverter (17) produces the voltages and/or currents by means of sinusoidal pulse modulation with a clock frequency in excess of 10 kHz.

8. A system according to claim 1 wherein the energy gained upon reduction of a positive rotational fluctuation as well as any energy gained in the case of a decelerating additional torque is at least partially stored and the stored braking energy due to rotational fluctuation is at least partially reused in the reduction of a negative rotational fluctuation.

9. A system according to claim 1 wherein the electrical machine (4) also performs the function of a starter.

10. A system according to claim 1 wherein the electrical machine (4), acting as a generator, supplies power at a relatively high voltage level and high-performance consumers are supplied electrically at the high voltage level.

11. A system according to claim 1 wherein the electrical machine (4) has a high torque density compared with the maximum torque, in particular in excess of $0.01$ $Nm/cm^3$.

12. A system according to claim 1 wherein the electrical machine (4) acts as an electromagnetic clutch in the drive train (2) and/or as an active transmission synchronization device or as part thereof.

13. A procedure for active reduction of rotational fluctuations of a shaft, comprising at least an electrical machine (4) the electrical machine (4) being controlled in such a way that
   it produces a rapidly varying torque, wherein, if no mean accelerating or decelerating, torque is generated, the rapidly varying torque defines a zero line and has a curved shape, and
   over which rapidly varying torque it superimposes a positive or negative torque, respectively, to additionally generate an accelerating or decelerating or rheostatic braking force, wherein as a result of the superimposition, the rapidly varying torque is only shifted with respect to the zero line while maintaining the curved shape, and
   wherein the rapidly varying torque acts in an alternating manner, i.e. by decelerating in the case of a positive rotational fluctuation of the shaft and by accelerating in the case of a negative rotational fluctuation of the shaft.

* * * * *